United States Patent
Michaud et al.

(10) Patent No.: US 9,705,980 B2
(45) Date of Patent: Jul. 11, 2017

(54) VISUALIZATION OF PERFORMANCE PARAMETERS OF DISTRIBUTED COMPUTER SYSTEMS

(71) Applicant: Teachers Insurance and Annuity Association of America, New York, NY (US)

(72) Inventors: Ethan Luke Michaud, Harrisburg, NC (US); Mathew Wade Pickering, Port Orange, FL (US); Nathaniel John Bates, Portsmouth, NH (US); Janusz M. Juda, Natick, MA (US); Thomas Steven Joyce, Washington, DC (US); William Val Arneth, III, Westborough, MA (US); Latrisha Devon Whitehead, Charlotte, NC (US); Gary Robert Couture, Hollis, NH (US); Louis Anthony Iannucci, Harrisburg, NC (US); Scott M. Blandford, Hopewell, NJ (US)

(73) Assignee: Teachers Insurance and Annuity Association of America, New York, NY (US)

( * ) Notice: Subject to any disclaimer, the term of this patent is extended or adjusted under 35 U.S.C. 154(b) by 184 days.

(21) Appl. No.: 14/197,501

(22) Filed: Mar. 5, 2014

(65) Prior Publication Data

US 2015/0256648 A1     Sep. 10, 2015

(51) Int. Cl.
G06F 15/16     (2006.01)
H04L 29/08     (2006.01)

(52) U.S. Cl.
CPC .......... H04L 67/1029 (2013.01); H04L 67/36 (2013.01)

(58) Field of Classification Search
CPC ......... H04L 29/06; H04L 67/42; H04L 67/10; G06F 17/3087; G06F 17/3089
USPC ........................................ 709/203, 204, 205
See application file for complete search history.

(56) References Cited

U.S. PATENT DOCUMENTS

| | | | | |
|---|---|---|---|---|
| 6,741,790 B1 * | 5/2004 | Burgess | ................. | G01C 11/00 386/227 |
| 9,177,076 B2 * | 11/2015 | Bajric | ............... | G06F 17/30902 |
| 2002/0078218 A1 * | 6/2002 | Feig | ....................... | H04L 29/06 709/231 |
| 2013/0297596 A1 * | 11/2013 | Mouline | ........... | G06F 17/30241 707/724 |
| 2014/0089461 A1 * | 3/2014 | Harris | ................ | G06F 17/3087 709/217 |

(Continued)

Primary Examiner — Normin Abedin
(74) Attorney, Agent, or Firm — Lowenstein Sandler LLP

(57) ABSTRACT

Systems and methods for visualization of performance parameters of distributed computer systems. An example method may comprise: receiving data representing a geographic location of a client computer system issuing a plurality of requests to a server computer system, the data further comprising a plurality of values representing one or more parameters of request processing by the server computer system; and generating a sequence of video frames, each video frame of the sequence of video frames comprising a visual element of a pre-defined shape overlaid over a geographic map in a position corresponding to the geographic location of the client computer system, wherein a pre-defined attribute of the visual element visually represents one or more values of the plurality of values.

17 Claims, 5 Drawing Sheets

(56) References Cited

U.S. PATENT DOCUMENTS

2014/0301715 A1\* 10/2014 Prat .................... H04N 21/4104
　　　　　　　　　　　　　　　　　　386/241

\* cited by examiner

VISUALIZATION OF PERFORMANCE PARAMETERS OF DISTRIBUTED COMPUTER SYSTEMS

TECHNICAL FIELD

The present disclosure is generally related to distributed computer systems, and is more specifically related to visualization of performance parameters of distributed computer systems.

BACKGROUND

A distributed computer system may comprise one or more components, including, e.g., web servers, application servers, database servers, and/or various other components. A plurality of geographically distributed clients may access the servers via a network comprising one or more local area networks and/or one or more wide area networks (e.g., the Internet). Performance and availability of the applications delivered by the distributed computer system may be monitored by an application performance management (APM) system that may collect, store, and process the data reflecting multiple performance and availability parameters of one or more components of the distributed computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for visualization of performance parameters of distributed computer systems.

A distributed computer system may comprise one or more components, including, e.g., web servers, application servers, database servers, and/or various other components. A plurality of geographically distributed clients may access the distributed computer system via a network comprising one or more local area networks and/or one or more wide area networks (e.g., the Internet). Each client may issue one or more requests that require processing by one or more components of the distributed computer system. Hence, the request processing time may vary significantly, depending upon the system state (e.g., characterized by the number and geographic distribution of active servers and the load upon those servers), request type, request parameters, etc. Real-time or historic data-based visualization of the client activity, request processing times, page load times, successfully processed and failed requests, and/or other related parameters may be useful for performing various network and application management functions.

Various aspects of the methods and systems for visualization of performance parameters of distributed computer systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
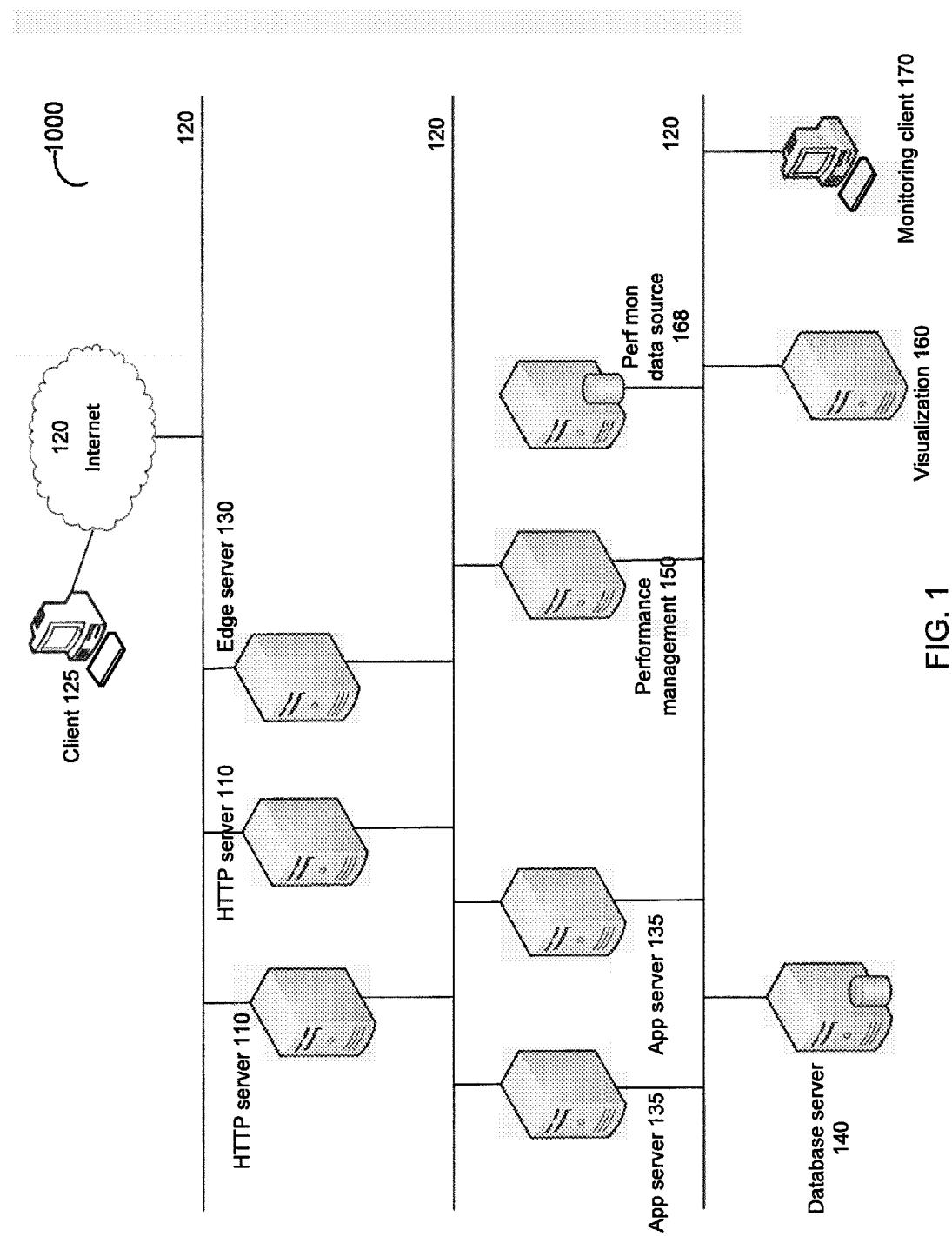
FIG. 1 schematically illustrates a high-level network diagram of an example distributed computer system, in accordance with one or more aspects of the present disclosure.

FIG. 1 schematically illustrates a high-level network diagram of an example distributed computer system 1000, in accordance with one or more aspects of the present disclosure. Firewalls, load balancers, network switches and various other components may be omitted from FIG. 1 for clarity. Computer systems, appliances, and network segments are shown in FIG. 1 for illustrative purposes only and do not in any way limit the scope of the present disclosure. Various other computer systems, components, appliances, and/or methods of their interconnection may be compatible with the methods and systems for visualization of performance parameters of distributed computer systems.

In an illustrative example, the distributed computer system 1000 may comprise one or more HTTP servers 110 which may be configured to receive, over one or more networks 120, requests from a plurality of geographically distributed clients 125. Networks 120 may comprise one or more local area networks and/or one or more wide area networks.

In certain implementations, a request initiated by client 125 may initially be routed to an edge server 130, which may then select, e.g., based on a load balancing scheme, an HTTP server 110 to which the client request should be routed. In addition to performing the load balancing, edge servers 130 may serve static content in response to client HTTP requests, and/or perform various other tasks.

In an illustrative example, a plurality of edge servers 130 may be geographically distributed so that a request initiated by client 125 would be routed to an edge server 130, which is selected based on the client geographic location and/or other request parameters. The edge server 130 may then forward the client-initiated request to a dynamically selected HTTP server 110. The latter may, upon parsing the request, issue one or more requests to one or more application servers 135. An application server 135 may process a request received from an HTTP server 110 and produce a response to be returned to the client computer system 125. The request processing by application server 135 may comprise issuing one or more requests to one or more database servers 140. The HTTP server 110 may then wrap the response produced by the application server 135 into one or more HTTP packets and return the response to the client computer system 125 (e.g., via an edge server 130).

The above described client request processing serves as an illustrative example only and does not in any way limit the scope of the present disclosure. Various other client request processing components and/or methods may be compatible with the methods and systems for visualization of performance parameters of distributed computer systems.

In certain implementations, the distributed computer system 1000 may further comprise one or more application performance management components 150 which may be represented by one or more software modules residing on one or more dedicated monitoring appliances and/or collocated with other functional components of the distributed computer system 1000. In an illustrative example, one or more application performance management components 150 may store the application performance monitoring data in one or more application performance monitoring data sources 168. The latter may be provided by file or block-level storage, relational databases, and/or data storage devices or systems of various other types.

In certain implementations, the application performance management functions performed by one or more application performance management components 150 may comprise the client-centric perspective, also referred to as end user experience (EUE). The latter may be described by a plurality of metrics including the number of requests issued by a client within a given time period, the request processing time (e.g., measured as the page load time), the number of server errors received in response to the client requests, etc. Real-time or historic data-based visualization of the EUE metrics may be useful for performing various network and application management functions.

In an illustrative example, the network traffic monitoring within the distributed computer system 1000 may be performed using port mirroring by one or more network switches. The switches may implement port mirroring by sending a copy of network packets seen on one or more switch ports to a network monitoring appliance connected to a pre-defined switch port. In another illustrative example, agent-based monitoring may involve injecting JavaScript or other code modules to one or more servers and/or client computer systems, in order to determine transaction-specific response times at various layers of the distributed computer system 1000.

The above described application performance monitoring methods serve as illustrative examples only and do not in any way limit the scope of the present disclosure. Various other application performance management systems and/or methods may be compatible with the methods and systems for visualization of performance parameters of distributed computer systems described herein.

In certain implementations, the distributed computer system 1000 may comprise a data visualization subsystem 160 designed to facilitate the visualization of data related to request processing by distributed computer system 1000. The data visualization subsystem 160 may be implemented as one or more software modules residing on one or more dedicated appliances and/or collocated with other functional components of the distributed computer system 1000.

The data visualization subsystem 160 may be designed to produce a data stream encoding a plurality of video frames visualizing one or more request processing parameters for requests issued by a plurality of geographically distributed client computer systems 125. In an illustrative example, the data visualization subsystem may comprise an HTTP server configured to wrap the visual content into a plurality of HTTP packets, which may be sent to a monitoring client 170. The latter may be provided by a wide range of computing devices, including personal computers, mobile computing devices, smart phones, etc.

The data visualization subsystem 160 may be configured to input real-time application performance monitoring data from one or more performance management components 150 and/or from other components of the distributed computer system 1000. In certain implementations, the data visualization subsystem 160 may be further configured to input historic application performance monitoring data from one or more application performance monitoring data sources 168.

In certain implementations, for one or more active client computer systems 125, the data visualization subsystem 160 may determine the client geographic location. In an illustrative example, the data visualization subsystem may receive the client IP address from edge server 130 or HTTP server 110 and query a geo-location database (not shown in FIG. 1) to retrieve the geographic coordinates corresponding to the client IP address. Alternatively, the data visualization subsystem may receive the client IP address and/or the client geographic coordinates from one or more application performance monitoring data sources 168 storing real-time and/or historic monitoring data.

In an illustrative example, the data visualization subsystem 160 may then determine processing times of one or more client requests by the distributed computer system, by querying one or more performance management components 150, one or more application performance monitoring data sources 168, and/or other components of the distributed computer system 1000. The data visualization subsystem 160 may generate a sequence of video frames such that each video frame of the sequence would comprise a visual element of a pre-defined shape (e.g., a circle) overlaid over a geographic map in the position corresponding to the geographic location of the client computer system 125. A pre-defined attribute of the visual element (e.g., the circle diameter) may visually represent the request processing time.

In another illustrative example, the data visualization subsystem 160 may query one or more performance management components 150, one or more application performance monitoring data sources 168, and/or other components of the distributed computer system 1000 in order to determine the number of requests issued by a given client within a pre-defined period of time. The data visualization subsystem 160 may generate a sequence of video frames such that each video frame of the sequence would comprise a visual element of a pre-defined shape (e.g., a circle) overlaid over a geographic map in the position corresponding to the geographic location of the client computer system 125. A defined attribute of the visual element (e.g., the circle diameter) may visually represent the number of requests issued by the client computer system 125 within a pre-defined period of time.

As noted herein above, the sequence of video frames generated by the data visualization subsystem may be displayed by the monitoring client 170. In certain implementations, the latter may comprise a graphical user interface configured to accept operator input to define the scope of the application performance monitoring data to be rendered on the display device of the monitoring client 170. In an illustrative example, the operator of the monitoring client 170 may specify the date/time range, the client computer system identifier, the client geographic location, the user identifier, the application identifier, the transaction type, the request type, the identifier of the server processing the client requests, and/or other parameters for filtering the application performance monitoring data to be visualized.

Figure 2:
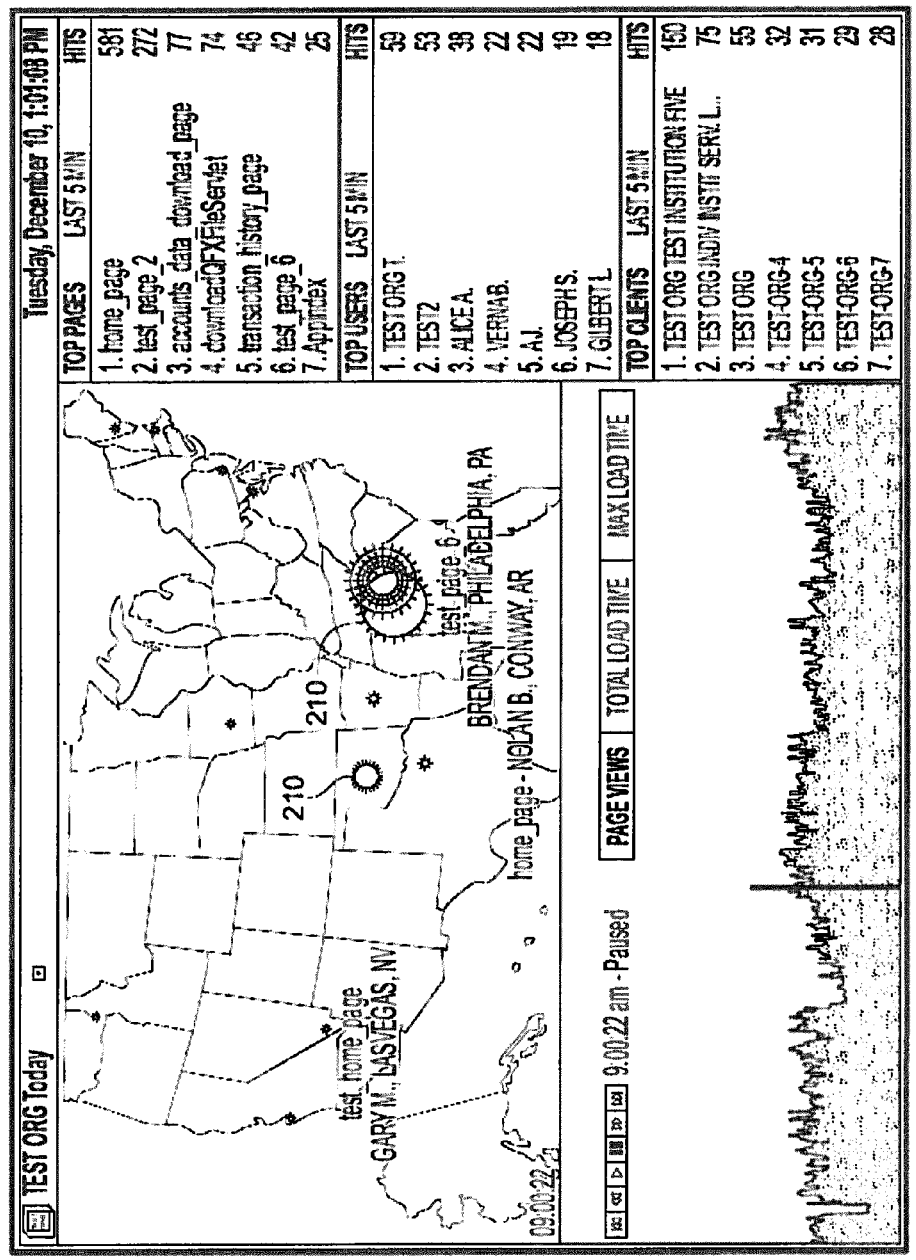
FIG. 2-3 schematically illustrate example video frames produced by the data visualization subsystem, in accordance with one or more aspects of the present disclosure.

FIG. 2 schematically illustrates an example video frame produced by the data visualization subsystem 160 in accordance with one or more aspects of the present disclosure. In an illustrative example, the video frame may be rendered within a browser window displayed by the monitoring client 170. The example video frame may comprise one or more circles 210 overlaid over a geographic map in the positions corresponding to the geographic locations of the respective client computer systems. In an illustrative example, the circle diameter may visually represent the request processing time by the distributed computer system 1000. Alternatively, the circle diameter may visually represent the number of requests issued by the corresponding client computer system within a pre-defined period of time. In certain implementations, the color of the circle may represent the error state of processing one or more client requests by the distributed computer system 1000 (e.g., a first pre-defined color may represent no errors in processing client requests, a second pre-defined color may represent an error of a first type, a third pre-defined color may represent an error of a second type, etc.).

In certain implementations, the data visualization subsystem may be further configured to output various textual information in the form of tables, lists, and/or free-formatted text. In an illustrative example, the textual information may include counts of page views by page identifier, user identifier, client identifier, client geographical location, client browser type, client Internet provider, etc. In another illustrative example, the textual information may include one or more real-time or historic rankings, such as top pages, top users, top clients, etc. The textual information may be outputted in various position of the screen, including screen frames and pop-up windows, which may be overlaid over the geographic map to visually reference the client geographic position.

Figure 3:
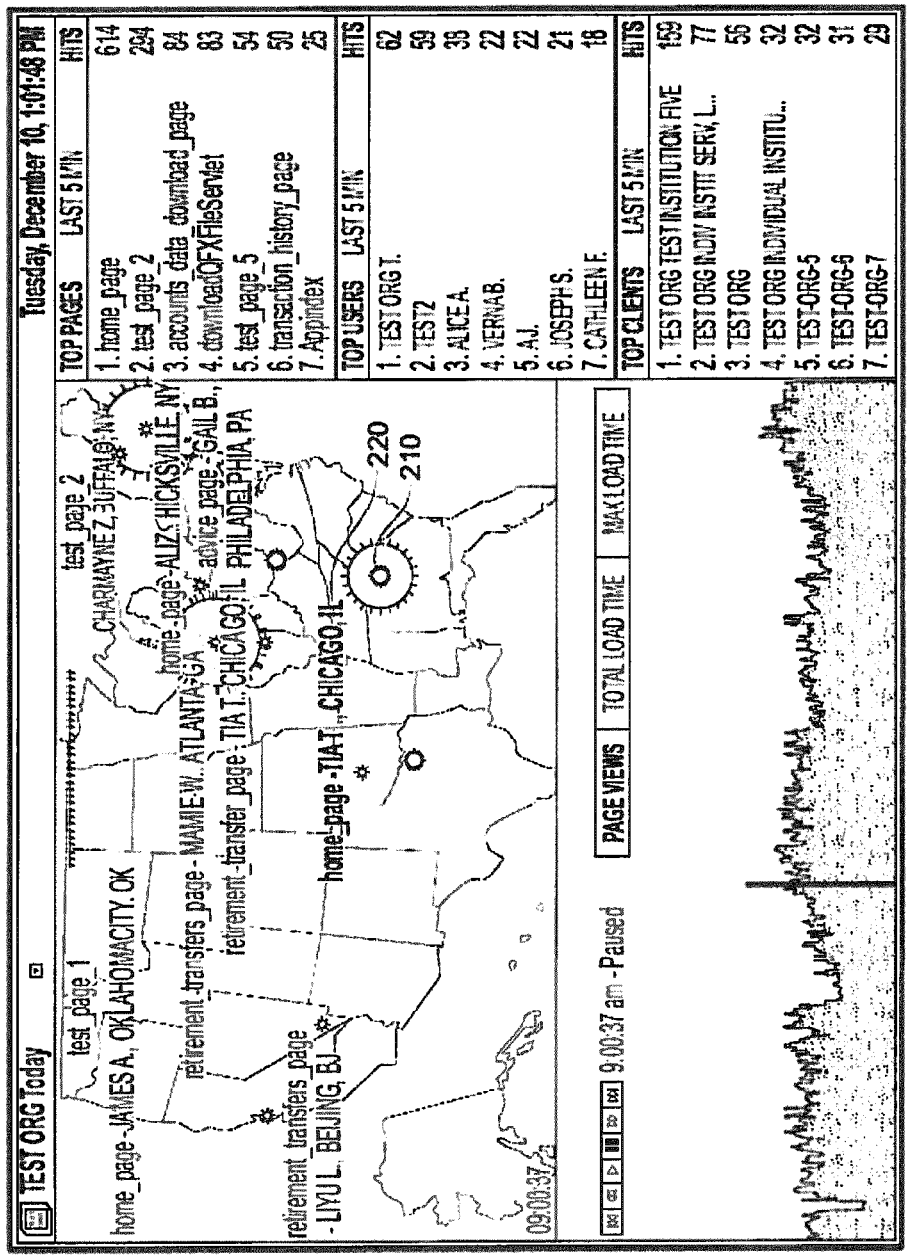

In certain implementations, each circle may be accompanied by a character string 220 representing various client, server, and/or request parameters, such as the client identifier, the user identifier, the application identifier, the page identifier, etc., as schematically illustrated by FIG. 3. The character string display position may visually reference the corresponding circle representing the client computer system on the geographic map, in order to induce a perception by the user of the existing "property-object" relationship between the character string and the corresponding circle (i.e., the character string denoting one or more properties of the object represented by the circle).

In certain implementations, the character string may represent an application page, and may be scrolled, in a sequence of video frames, in a pre-defined direction over the screen. In an illustrative example, the scrolling speed of the character string in the sequence of video frames may represent one or more application page parameters, e.g., the time of loading the application page by the client computer system.

As noted herein above, the graphical user interface of the monitoring client may comprise one or more controls to receive operator input to specify the date/time range, the client computer system identifier, the client geographic location, the user identifier, the application identifier, the transaction type, the request type, the identifier of the server processing the client requests, and/or other parameters for filtering the application performance monitoring data to be visualized.

In certain implementations, the graphical user interface of the monitoring client may further comprise zoom-in/zoom-out controls to zoom a video frame fragment, as schematically illustrated by FIG. 3. In certain implementations, the graphical user interface of the monitoring client may further comprise one or more of stop, play, pause, fast forward and/or rewind controls to control the data visualization process.

Figure 4:
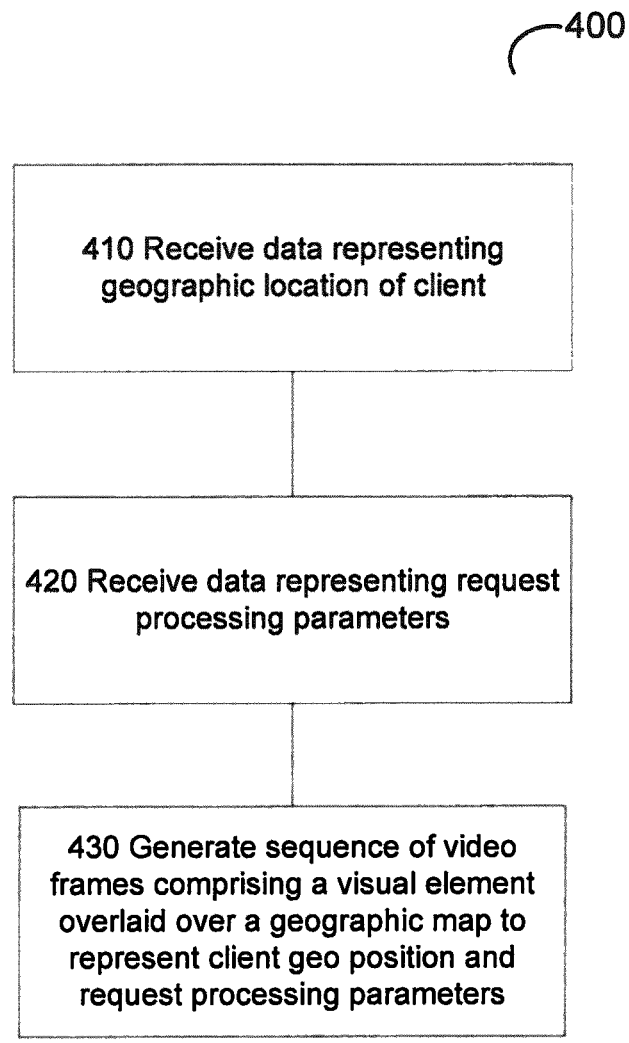
FIG. 4 depicts a flow diagram of an example method for visualization of performance parameters of distributed computer systems, in accordance with one or more aspects of the present disclosure.

FIG. 4 depicts a flow diagram of an example method 400 for visualization of performance parameters of distributed computer systems, in accordance with one or more aspects of the present disclosure. Method 400 and/or each of its individual functions, routines, subroutines, or operations may be performed by one or more general purpose and/or specialized processing devices. Two or more functions, routines, subroutines, or operations of method 400 may be performed in parallel or in an order that may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, method 400 may be performed by an example computer system 500 described herein below with references to FIG. 5.

Referring to FIG. 4, at block 410, the processing device implementing the method may receive the data representing geographic locations of one or more client computer systems issuing a plurality of requests to a server computer system.

At block 420, the processing device may further receive a plurality of values representing one or more parameters of request processing by the server computer system. In illustrative examples, the parameters of request processing by the server computer system may represent a request processing time by the server computer system, and/or a number of requests issued by the client computer system in a pre-defined period of time.

At block 430, the processing device may generate a sequence of video frames. Each video frame of the sequence may comprise a visual element of a pre-defined shape (e.g., a circle) overlaid over a geographic map in the position corresponding to the geographic location of the client computer system, as described in more details herein above. A pre-defined attribute of the visual element (e.g., the circle diameter) may visually represent the values of the parameters of request processing by the server computer system.

In certain implementations, each visual element may be accompanied by a character string representing various client, server, and/or request parameters, such as the client identifier, the user identifier, the application identifier, the page identifier, etc., as described in more details herein above. The character string display position may visually reference the corresponding visual element representing the client computer system on the geographic map In certain implementations, the character string may represent an application page, and may be scrolled, in a sequence of video frames, in a pre-defined direction over the screen, as described in more details herein above. In an illustrative example, the scrolling speed of the character string in the sequence of video frames may represent one or more application page parameters, e.g., the time of loading the application page by the client computer system.

In certain implementations, the color of the visual element may represent the error state of processing one or more client requests, as described in more details herein above. In an illustrative example, a first pre-defined color may represent no errors in processing client requests, a second pre-defined color may represent an error of a first type, a third pre-defined color may represent an error of a second type, etc.

In certain implementations, generating the sequence of video frames may comprise applying a configurable filter to the data. The configurable filter may specify a date and time range, a client computer system identifier, a user identifier, a client geographic location, an application identifier, a transaction type, a request type, and/or an identifier of a server processing client requests, as described in more details herein above.

In certain implementations, the processing device may further receive a user input controlling the parameter visualization screen. Responsive to receiving the user input, the processing device may zoom, rewind, or fast forward one or more video frames, as described in more details herein above.

Figure 5:
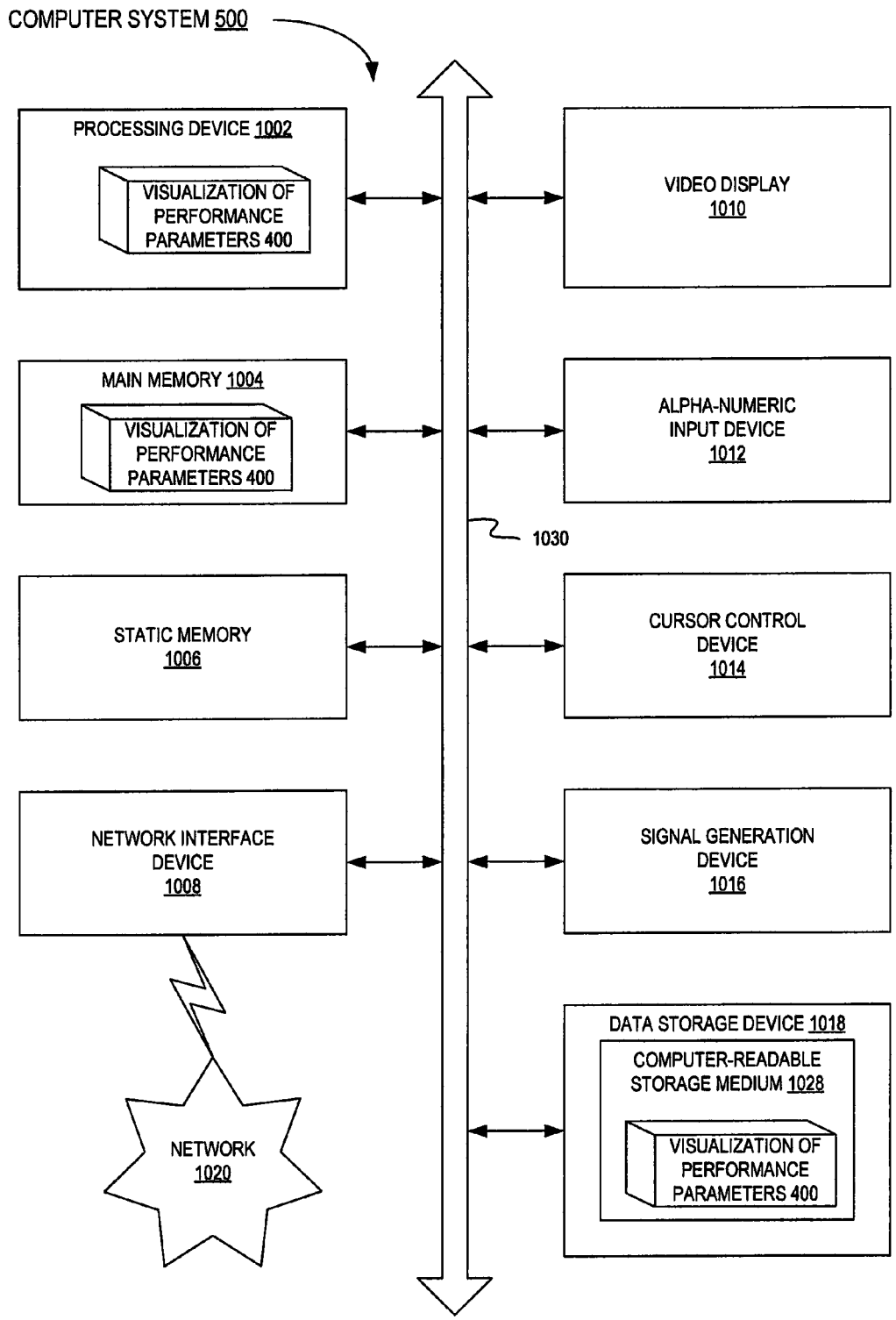
FIG. 5 depicts a block diagram of an illustrative computing device operating in accordance with one or more aspects of the present disclosure.

FIG. 5 illustrates a diagrammatic representation of a computer system 500 within which a set of instructions, for causing the computing device to perform the methods discussed herein, may be executed. The computer system 500 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computer system 500 may implement the functionality of the data visualization subsystem 160, as described in more details herein above.

The example computer system 500 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the method 400 for visualization of performance parameters of distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 400 for visualization of performance parameters of distributed computer systems, in accordance with one or more aspects of the present disclosure) implementing any one or more of the methods or functions described herein. Instructions implementing the method 400 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:

receiving, by a processing device, application performance monitoring data reflecting performance of a server computer system employed to process requests initiated by a plurality of geographically distributed client computer systems, the real-time application performance monitoring data comprising an Internet Protocol (IP) address of a client computer system and values of one or more application performance monitoring parameters, wherein the application performance monitoring parameters comprise a request processing time by the server computer system of one or more requests issued by a client computer system and a number of requests issued by the client computer system to the server computer system in a pre-defined period of time;

querying a geo-location database to determine a geographic location of the client computer system corresponding to the IP address; and generating a sequence of video frames, each video frame of the sequence of video frames comprising a visual element of a pre-defined shape overlaid over a geographic map in a position corresponding to the geographic location of the client computer system, wherein a pre-defined attribute of each visual element visually represents one or more application performance monitoring parameters, wherein a color of the visual element represents an error state of processing one or more requests issued by the client computer system, wherein generating the sequence of video frames comprising applying, to the application performance monitoring data, a configurable filter specifying at least one of: a date and time range, a client computer system identifier, a user identifier, a client geographic location, an application identifier, a transaction type, a request type, or an identifier of a server processing client requests.

2. The method of claim 1, wherein the visual element is provided by a circle.

3. The method of claim 1, wherein the pre-defined attribute of the visual element is provided by a size of the visual element.

4. The method of claim 1, wherein each video frame of the sequence of video frames further comprises a character string representing at least one of: a client identifier, a user identifier, an application identifier, or a page identifier.

5. The method of claim 4, wherein a scrolling speed of the character string in the sequence of video frames represents a time of loading the application page.

6. The method of claim 1, further comprising displaying the sequence of video frames.

7. The method of claim 1, wherein the application performance monitoring data represents one of real-time data or historic data.

8. The method of claim 1, further comprising: zooming one or more video frames of the plurality of video frames responsive to receiving a user input.

9. The method of claim 1, further comprising: rewinding one or more video frames of the plurality of video frames responsive to receiving a user input.

10. The method of claim 1, further comprising: fast forwarding one or more video frames of the plurality of video frames responsive to receiving a user input.

11. The method of claim 1, wherein a size of the visual element represents the request processing time by the server computer system of the requests issued by the client computer system in a pre-defined period of time.

12. The method of claim 1, wherein a size of the visual element represents the number of requests issued by the client computer system to the server computer system in a pre-defined period of time.

13. The method of claim 1, wherein a first pre-defined color of the visual element represents a first error state in processing the requests issued by the client computer system to the server computer system and a second pre-defined color of the visual element represents a second error state in processing the requests issued by the client computer system to the server computer system.

14. A system, comprising:

a memory; and one or more processors coupled to the memory, the processors to:

receive application performance monitoring data reflecting performance of a server computer system employed to process requests initiated by a plurality of geographically distributed client computer systems, the real-time application performance monitoring data comprising an Internet Protocol (IP) address of a client computer system and values of one or more application performance monitoring parameters, wherein the application performance monitoring parameters comprise a request processing time by the server computer system of one or more requests issued by a client computer system and a number of requests issued by the client computer system to the server computer system in a pre-defined period of time;

query a geo-location database to determine a geographic location of the client computer system corresponding to the IP address; and generate a sequence of video frames, each video frame of the sequence of video frames comprising a visual element of a pre-defined shape overlaid over a geographic map in a position corresponding to the geographic location of the client computer system, wherein a pre-defined attribute of each visual element visually represents one or more application performance monitoring parameters, wherein a color of the visual element represents an error state of processing one or more requests issued by the client computer system, wherein generating the sequence of video frames comprising applying, to the application performance monitoring data, a configurable filter specifying at least one of: a date and time range, a client computer system identifier, a user identifier, a client geographic location, an application identifier, a transaction type, a request type, or an identifier of a server processing client requests.

15. The system of claim 14, wherein each video frame of the sequence of video frames further comprises a character string representing at least one of: a client identifier, a user identifier, an application identifier, or a page identifier.

16. A computer-readable non-transitory storage medium comprising executable instructions that, when executed by a processing device, cause the processing device to perform operations comprising:

receiving application performance monitoring data reflecting performance of a server computer system employed to process requests initiated by a plurality of geographically distributed client computer systems, the real-time application performance monitoring data comprising an Internet Protocol (IP) address of a client computer system and values of one or more application performance monitoring parameters, wherein the application performance monitoring parameters comprise a request processing time by the server computer system of one or more requests issued by a client computer system and a number of requests issued by the client computer system to the server computer system in a pre-defined period of time;

querying a geo-location database to determine a geographic location of the client computer system corresponding to the IP address; and generating a sequence of video frames, each video frame of the sequence of video frames comprising a visual element of a pre-defined shape overlaid over a geographic map in a position corresponding to the geographic location of the client computer system, wherein a pre-defined attribute of each visual element visually represents one or more application performance monitoring parameters, wherein a color of the visual element represents an error state of processing one or more requests issued by the client computer system, wherein generating the sequence of video frames comprising applying, to the application performance monitoring data, a configurable filter specifying at least one of: a date and time range, a client computer system identifier, a user identifier, a client geographic location, an application identifier, a transaction type, a request type, or an identifier of a server processing client requests.

17. The computer-readable non-transitory storage medium of claim 16, further comprising executable instructions causing the processing device to display the sequence of video frames.

* * * * *